(12) United States Patent
Hataoka et al.

(10) Patent No.: US 7,547,415 B2
(45) Date of Patent: Jun. 16, 2009

(54) FLUID CHIP, FLUID MOVEMENT CONTROL METHOD USING THE SAME, AND CHEMICAL REACTION APPARATUS

(75) Inventors: Yukari Hataoka, Osaka (JP); Tetsuo Yukimasa, Nara (JP); Hiroaki Oka, Osaka (JP)

(73) Assignee: Panasonic Corporation, Osaka (JP)

( * ) Notice: Subject to any disclaimer, the term of this patent is extended or adjusted under 35 U.S.C. 154(b) by 181 days.

(21) Appl. No.: 11/510,726

(22) Filed: Aug. 28, 2006

(65) Prior Publication Data

US 2006/0292032 A1     Dec. 28, 2006

(30) Foreign Application Priority Data

Feb. 10, 2005   (JP)   ............... 2005-034591

(51) Int. Cl.
*B01L 3/00* (2006.01)
(52) U.S. Cl. .................. 422/99; 422/100; 422/102; 422/103; 436/180; 137/599.01; 251/65
(58) Field of Classification Search ........... 422/99–101, 422/102–103; 435/287.2; 436/180; 137/599.01; 251/65
See application file for complete search history.

(56) References Cited

U.S. PATENT DOCUMENTS

2002/0123134 A1 *   9/2002   Huang et al. ............. 435/287.2

FOREIGN PATENT DOCUMENTS

| JP | 2001-132861 A | 5/2001 |
|---|---|---|
| JP | 2003-14772 A | 1/2003 |
| JP | 2003-158883 A | 5/2003 |
| JP | 2004-73995 A | 3/2004 |
| JP | 2004-77258 A | 3/2004 |

OTHER PUBLICATIONS

International Preliminary Report on Patentability, issued in corresponding International Patent Application No. PCT/JP2006/301324, dated on Aug. 23, 2007.

* cited by examiner

*Primary Examiner*—Jill Warden
*Assistant Examiner*—Jyoti Nagpaul
(74) *Attorney, Agent, or Firm*—McDermott Will & Emery LLP

(57) ABSTRACT

A fluid chip has a liquid support 25 for supporting a liquid 24, a fluid passage 22 formed by being surrounded by the liquid support 25 and through which the liquid 24 moves, and a plurality of magnetic particles 21 disposed in the fluid passage 24. The magnetic particles 21 are aggregated by a permanent magnet 23 so as to block the fluid passage 22 and thus cut off flow of the liquid 24. The magnetic particles 21 are dispersed along a part of a wall of the fluid passage 22 so as to open the fluid passage 22 and thus allow the liquid 24 to flow.

26 Claims, 12 Drawing Sheets

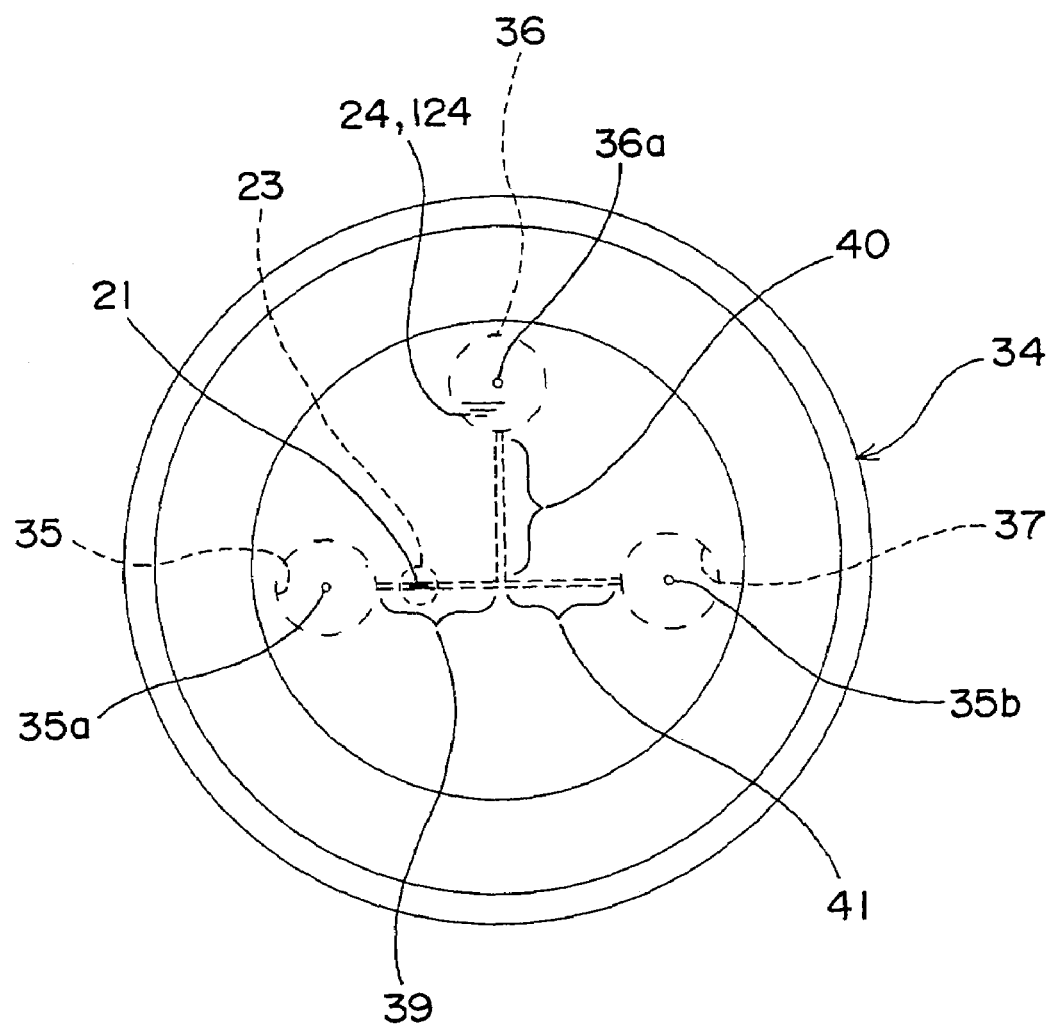

FLUID CHIP, FLUID MOVEMENT CONTROL METHOD USING THE SAME, AND CHEMICAL REACTION APPARATUS

This is a continuous application of International Application No. PCT/JP2006/301324, filed Jan. 27, 2006.

BACKGROUND OF THE INVENTION

The present invention relates to a fluid chip that has magnetic particles therein and can be suitably used for executing a chemical reaction in a micro-region, a fluid movement control method using the fluid chip, and a chemical reaction apparatus.

DESCRIPTION OF THE RELATED ART

Various fluid chips called "μ-TAS" for executing a biochemical or chemical reaction in a micro-region on a substrate have been developed. Such fluid chips are expected to be useful for health diagnosis chips and the like for which rapidness is required, since shortened reaction times and improved reaction efficiencies are anticipated due to very small amounts of liquid handled by the fluid chips.

In a fluid chip, reaction chambers, chambers for accommodating samples to be analyzed or reaction liquids, and micro channels (with diameters of approximately 1 to 1000 μm) communicating these chambers with each other are integrated together in a micro-region of a substrate, and very small amounts of the samples or reaction liquids (approximately $10^{-3}$ to 1000 μL for each) need to be transported through the micro channels while being controlled. In the following, the micro channels can be referred to merely as "fluid passage".

For achieving the transport, it is required that a defined amount of liquid is sent into a targeted fluid passage. For switching fluid passages through which the liquid flows, a contrived means for liquid delivery or a valve to be operated in the fluid passage is employed.

Generally, in a conventional fluid chip having fluid passages connected to chambers, it is difficult to dispose a complex valve having a function for switching a plurality of fluid passage by itself. Thus, for switching the fluid passages, it is necessary to respectively dispose valves in the fluid passages and control the valves corresponding to switched fluid passages.

A structure and liquid delivery method of the fluid chip largely affect the switching of the fluid passages. Specifically, an efficient selection of the fluid passages is almost determined at a stage of designing the fluid chip and is generally difficult to be variously modified after fabrication of the fluid chip has been completed.

For resolving these problems, for example, Japanese Patent Application Laid-open Publication No. 2004-77258 discloses a method for switching fluid passages using a magnetic fluid. Specifically, in this publication, it is described that a fluid passage switching method characterized in that a magnetic fluid is introduced into capillary-like fluid passages, and the fluid passage through which a fluid to be controlled flows is switched by changing a magnetic field acting on the magnetic fluid.

The method disclosed in the publication will be described with reference to FIG. 10. A permanent magnet (not shown) is disposed on the underside of a fluid passage 5 so as to fix a magnetic fluid M in the fluid passage 5, thereby the fluid passage 5 is blocked. In this state, a colored water introduced into a fluid passage 4 from an inlet 10 flows into a fluid passage 6 through a merging portion 13 and flows out from an outlet 12; but it does not flow into the fluid passage 5.

A similar method in which a liquid is moved using a magnetic fluid is also disclosed in Japanese Patent Application Laid-open Publication No. 2003-14772.

With the fluid chip using valves as described above, the number of valves increases as structure of the fluid chip becomes more complex. The increased number of the valves makes it difficult to control the valves efficiently. Further, if the number of provided valves is equal to or more than that of fluid passages, it is difficult to miniaturize the fluid chip. In addition, since elaborate fluid passage design is generally required for the fluid chip, it is difficult to modify the fluid passage layout after the design has been completed. In the case of making some modification to the fluid passage layout, fundamental alteration of the fluid passage design should be attempted.

As discussed above, the conventional art of this technical field has problems in terms of the difficulty of controlling the valves and micro-fabricating the valves, and the low degree of freedom of the fluid passage layout.

Further, with the fluid passage switching method for capillary-like fluid passage using the magnetic fluid, viscosity of the magnetic fluid should be considered regarding introduction of the magnetic fluid into the capillary-like fluid passages. In addition, it is consider to choice a solvent suitable for the magnetic fluid. Thus, there are many parameters that need to be considered.

Furthermore, in case of using the magnetic fluid, although blockage of the fluid passage can be achieved, opening the fluid passage is difficult. Specifically, since the magnetic fluid is a liquid, the only option for removing the magnetic fluid acting as a plug from the fluid passage is to move the magnetic fluid by a magnet to a position where the magnetic fluid will not impede the flow of the liquid being handled. However, the moved magnetic fluid affects the surrounding liquid resulting in that the surrounding liquid is moved together with the magnetic fluid.

SUMMARY OF THE INVENTION

It is an object of the present invention to resolve the above problems of the prior art, and provide a fluid chip having an openable and closable valve, and a fluid movement control method using the same, and a chemical reaction apparatus.

A first aspect of the present invention provides a fluid chip, comprising, a liquid support for supporting a liquid, a fluid passage defined by being surrounded by the liquid support and through which the liquid moves, and a plurality of magnetic particles disposed in the fluid passage. Reversible switching is possible between a closed state in which a first magnetic force acts on the magnetic particles so as to aggregate the magnetic particles, thereby blocking the fluid passage and cutting off a flow of the liquid, and an open state in which a second magnetic force weaker than the first magnetic force acts on the magnetic particles so as to disperse the magnetic particles along a part of a wall of the fluid passage, thereby opening the fluid passage and allowing the liquid to flow Further, a second aspect of the present invention provides a method of controlling movement of liquid in a fluid chip. The fluid chip comprises a liquid support for supporting a liquid, a fluid passage defined by being surrounded by the liquid support and through which the liquid moves, and a plurality of magnetic particles disposed in the fluid passage. The method comprises, making a first magnetic force act from a magnet on the magnetic particles so as to aggregate the magnetic particles, thereby blocking the fluid passage and cutting off a flow of the liquid, and making a second magnetic force weaker than the first magnetic force act from the magnet on the magnetic particles so as to disperse the magnetic particles along a part of a wall of the fluid passage, thereby opening the fluid passage and allowing the liquid to blow. Reversible switching is possible between the aggregation of the magnetic particles by making the first magnetic force act thereon, and the dispersion of the magnetic particles by making the second magnetic force act thereon.

Furthermore, a third aspect of the present invention provides a chemical reaction apparatus comprising, a fluid chip having at least one fluid passage, at least one chamber, and a plurality of magnetic particles disposed in the fluid passage, a liquid being introduced from outside into the fluid passage and the chamber followed by a chemical reaction in the chamber or the fluid passage, and a magnetic field generator capable of controlling a magnetic field generated in the fluid chip such as to reversibly switch between a closed state in which a first magnetic force acts on the magnetic particles so as to aggregate the magnetic particles, thereby blocking the fluid passage and cutting off a flow of the liquid, and an open state in which a second magnetic force weaker than the first magnetic force acts on the magnetic particles so as to disperse the magnetic particles along a part of a wall of the fluid passage, thereby opening the fluid passage and allowing the liquid to flow.

According to the present invention, a valve can be formed by collecting magnetic particles in an arbitrary position in the fluid passage using the magnetic force, and moreover the valve can be opened and closed by changing the magnetic field, resulting in that movement of the liquid can be controlled without affecting the flow of the liquid. Further, because the valve of the magnetic particles can be formed in the arbitrary position without affecting the flow of the liquid, a high degree of freedom of the fluid passage layout is obtained.

Further, arranging the vale of the magnetic particles at the arbitrary position in the fluid passage of the fluid chip in such a manner increases a degree of freedom in fluid passage design of the fluid chip such as for chemical reaction in a micro-region, resulting in that a more complex reaction system can be achieved.

BRIEF DESCRIPTION OF THE DRAWINGS

Other objects and characteristics of the present invention shall be clarified by the following description on the preferred embodiments with reference to accompanying drawings, in which.

FIG. 6 is a plan view showing a chemical reaction apparatus of Example 1;

DESCRIPTION OF THE PREFERRED EMBODIMENTS

Referring to FIGS. 1A to 2B, the principle of a valve opening/closing method using magnetic particles according to a fluid movement control method of the present invention will be described. The plate-like fluid chip shown in FIGS. 1A to 2B is provided with a liquid support 25 for supporting a liquid 24, a micro channel or a fluid passage 22 defined by being surrounded by the liquid support 25 and through which the liquid 24 moves, and a plurality of magnetic particles 21 disposed in the fluid passage 22.

Figure 1A:
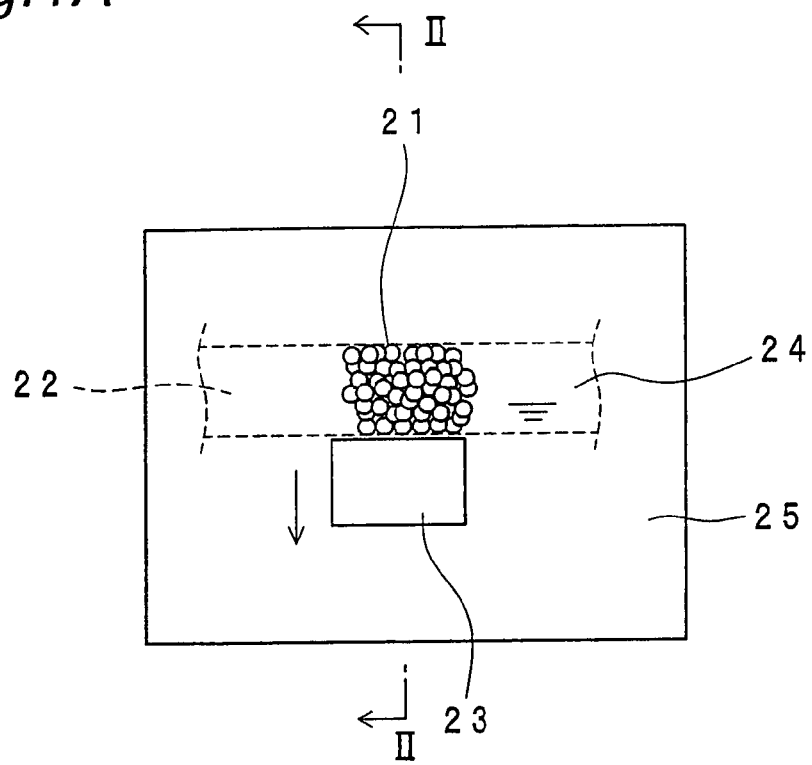
FIG. 1A is a schematic view for explaining a principle of a valve opening/closing method using magnetic particles according to the present invention (valve closed state)
Figure 1B:
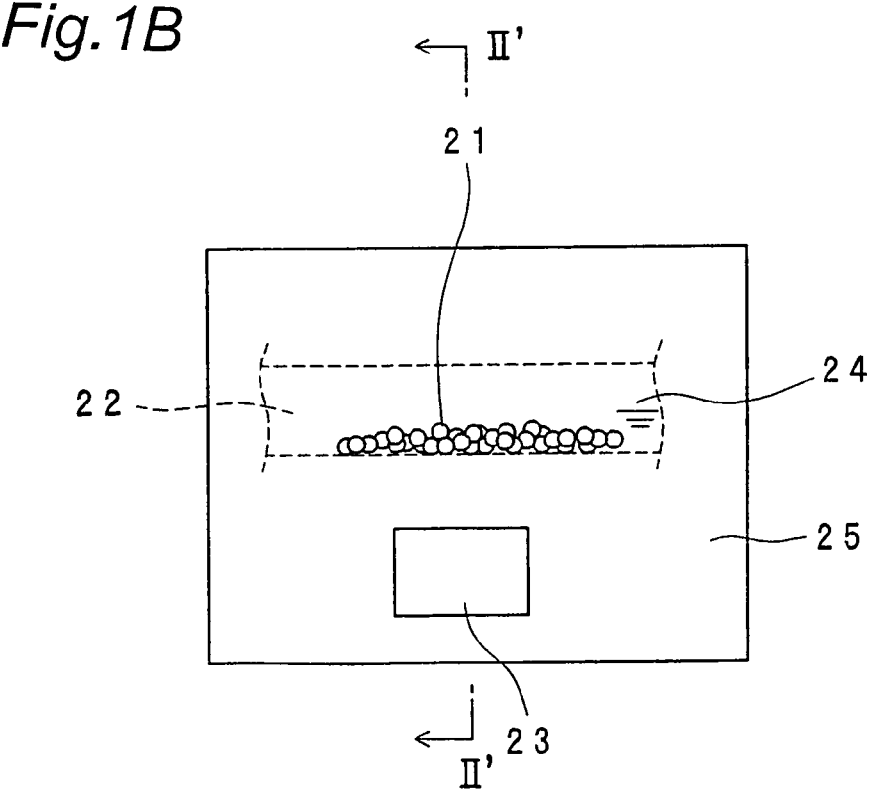
FIG. 1B is a schematic view for explaining the principle of the valve opening/closing method using magnetic particles according to the present invention (valve open state)
Figure 2A:
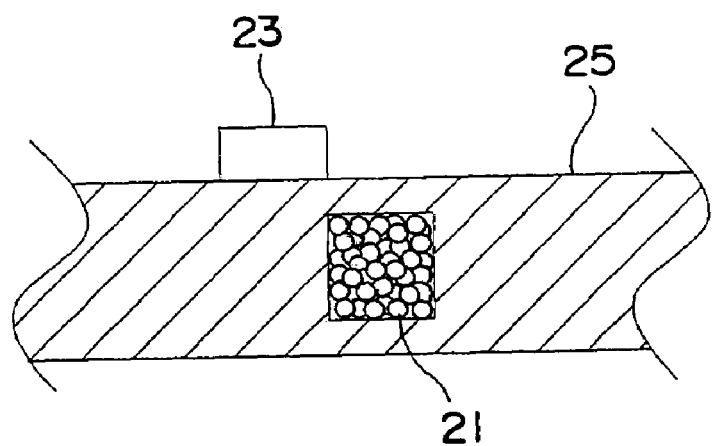
FIG. 2A is a sectional view along a line II-II in FIG. 1A.
Figure 2B:
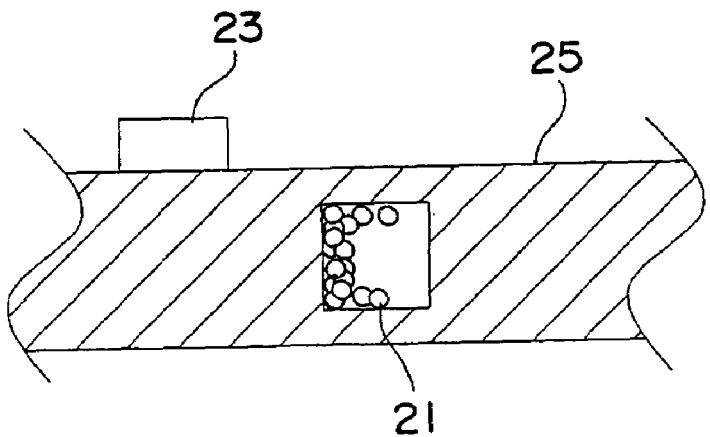
FIG. 2B is a sectional view along a line II-II in FIG. 1B.

In the present invention, the magnetic particles are used to constitute a valve, and this valve is opened and closed. When the fluid passage 22 is to be blocked, as shown in FIGS. 1A and 2A, a permanent magnet 23 is brought close to a site of the fluid passage 22 where the magnetic particles 21 are disposed, so that a relatively strong magnetic force (first magnetic force) acst on the magnetic particles 21, thereby the magnetic particles 21 are aggregated in the fluid passage 22 so as to block the fluid passage 22 and cut off the flow of the liquid 24 (valve closed state). On the other hand, the fluid passage 22 is to be opened, as shown in FIGS. 1B and 2B, the permanent magnet 23 is moved away from the fluid passage 22, so that a relatively weak magnetic force (second magnetic force) acts on the magnetic particles 21, thereby the magnetic particles 21 are collected in a state where they are dispersed along a part of a wall of the fluid passage 22, thereby the aggregation of the magnetic particles 21 together is released (open valve state). As a result, the fluid passage 22 is opened, and hence the liquid 24 can flow through the fluid passage 22. In this way, the valve can be opened and closed by controlling the position of the permanent magnet 23 relative to the magnetic particles 21, i.e. by controlling the strength of the magnetic force acting from the permanent magnet 23 on the magnetic particles 21. These opening and closing hardly affect on the flow of the liquid 24 in the fluid passage 22. Further, by adjusting the magnetic force acting from the permanent magnet 23 on the magnetic particles 21, the aggregation (the closed valve state) and the dispersion (the open valve state) of the magnetic particles 21 can be reversibly repeated.

In the example shown in FIGS. 1A to 2B, the magnetic force acting on the magnetic particles 21 is adjusted by moving the permanent magnet 23 on the liquid support 25. However, the magnetic force acting on the magnetic particles 21 may instead be adjusted by moving the permanent magnet 23 in a direction away from the liquid support 25.

Figure 3:
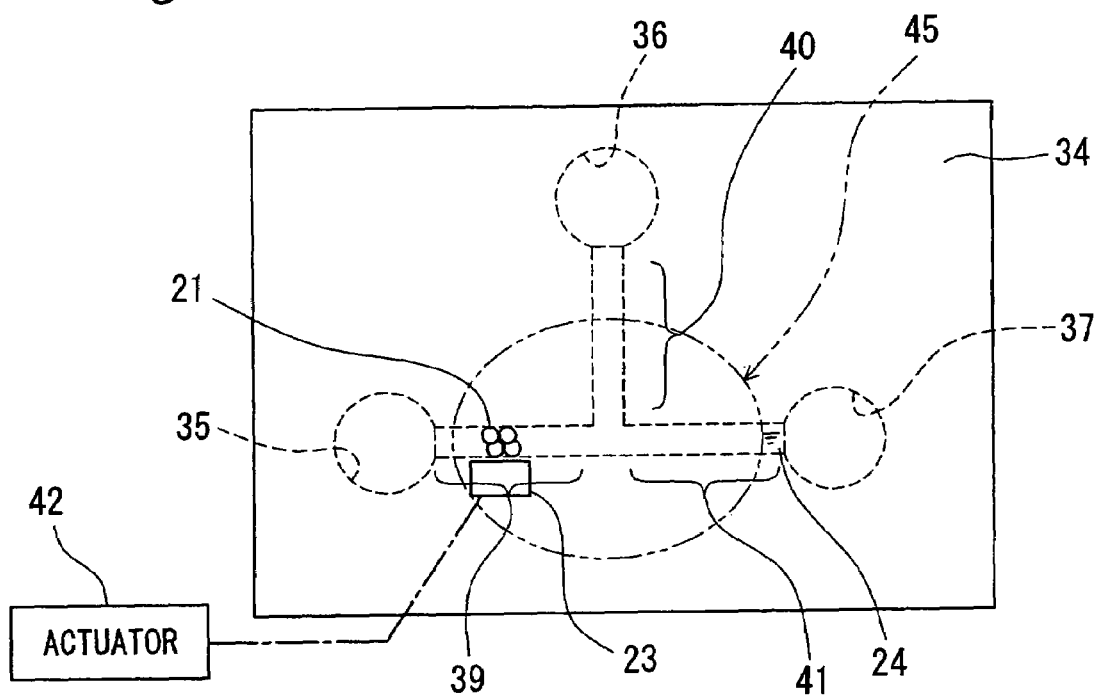
FIG. 3 is a schematic plan view showing a chemical reaction apparatus in which a valve is formed by collecting magnetic particles according to the present invention.

FIG. 3 shows an example of a chemical reaction apparatus using the fluid movement control method of the present invention. This chemical reaction apparatus has a liquid support 34 for supporting a liquid 24. Provided inside the liquid support 34 are first, second, and third chambers 35, 36, and 37, and first, second, and third fluid passages (micro channels) 39, 40, and 41 for liquid delivery. The fluid passages 39, 40, and 41 connect the chambers 35, 36, and 37 with each other. Specifically, one ends of the first to third fluid passages 39 to 41 are respectively connected with one of the first to third chambers 35 to 37. Further, the other ends of the first to third fluid passages 39 to 41 merge with each another at one position. In other words, the fluid passages 39 to 41 branch away from one another at this position. Furthermore, the first fluid passage 39 and the third fluid passage 41 extend in the same direction, whereas the second fluid passage 40 extends in a direction orthogonal to the first and third fluid passages 39 and 41. The liquid support 34 having the chambers 35 to 37 and the fluid passages 39 to 41 therein constitutes a fluid chip for executing chemical reaction in a micro-region.

Magnetic particles 21 are introduced to a site in one of the fluid passages 39 to 41. A permanent magnet 23 is disposed on an upper side of the liquid support 34 in the drawings. Further, there is provided an actuator 42 for moving the permanent magnet 23 on the liquid support 34. This actuator 42 comprises an X-Y table, for example. The permanent magnet 23 and the actuator 42 constitute one example of a magnetic field generator in the present invention.

Moreover, an opening (not shown) that communicates with the outside of the liquid support 34 is provided in the liquid support 34 in at least one position among the fluid passages 39 to 41 and the chambers 35 to 37; the liquid 24 can be introduced from the outside into the fluid passages 39 to 41 and the chambers 35 to 37 via this opening.

There are no particular limitations on the material and shape of the liquid support 34 constituting the fluid chip; for example, glass, a resin, a metal, or the like can be used. As long as the liquid support 34 has the fluid passages (micro channels) and the chambers therein, there are no particular limitations on it.

An cross sectional area of each of the fluid passages 39 to 41 provided in the liquid support 34 is preferably not less than 1 $\mu m^2$ and not more than $1\times10^6$ $\mu m^2$ (i.e., in the case that the cross section is square, a width thereof is preferably not less than 1 µm and not more than 1000 µm, and a depth thereof is preferably not less than 1 µm and not more than 1000 µm). The present invention is suited to an arrangement where two or more fluid passages merge with each other. Further, application of the present invention is not limited to the arrangement shown in FIG. 3 where the fluid passages 39 to 41 merge together at the one position. Indeed, the present invention can also be applied in the case, for example, that a plurality of fluid passages branch out directly from a chamber. Furthermore, there is no limitation on the number of fluid passages.

There are no particular limitations on the sectional shape of the chambers 35 to 37. In addition to the circular shape shown in the drawings, the sectional shape may be elliptical, rectangular, hexagonal, or the like. A size of each of the chambers 35 to 37 preferably ranges approximately from 1 to 50,000 µm in both of lengthways and crossways, and approximately from 1 to 5000 µm in depth. The width and depth of the chambers 35 to 37 may be the same as those of the fluid passages 39 to 41.

The magnetic particles 21 used in the present invention have some degree of magnetism themselves. Specifically, even in the case that there is no magnetic force acting on the magnetic particles 21 from the permanent magnet 23, the magnetic particles 21 maintain to some extent a state of being collected together by magnetic forces acting therebetween. Further, even in the case that a relatively weak magnetic force is acting on the magnetic particles 21 from the permanent magnet 23, the magnetic particles 21 maintain a state of being dispersed along a part of a fluid passage wall against the flow of the liquid 24 in the fluid passage. However, unless a strong magnetic force is acting on the magnetic particles 21 from the permanent magnet 23, the magnetic particles 21 are not aggregated in the fluid passage so as to block it. Moreover, each of the magnetic particles 21 preferably have a diameter in a range of not less than 1 µm and not more than 100 µm, this being approximately 1/100 of the width of the fluid passage. For example, the diameter of the magnetic particle 21 is preferably approximately 1 to 10 µm relative to the fluid passage width of 100 to 1000 µm. The size of the magnetic particles 21 is important in the present invention. Specifically, nanometer-order particles are not suitable in the present invention because of that the magnetic particles having such size are remarkably dispersed in the liquid 24 and that attractive force by the magnetic field acting on the magnetic particles having such size is weak. More specifically, the material of the magnetic particles 21 is a material having a property of being attracted by a magnetic field such as iron, cobalt, nickel, a rare earth, or an oxide or alloy thereof.

A surface of each of the magnetic particles 21 may be treated so as to have an opposite property to that of the liquid 24. Specifically, in the case that the liquid 24 is a hydrophilic liquid such as an aqueous solution, the surfaces of the magnetic particles 21 are preferably treated so as to be hydrophobic, and thus made to be water-repellent. Examples of such treatment include a treatment with a water-repellent polymer, and modification of the magnetic particles 21 with hydrophobic functional groups. For example, an acrylate treatment can be employed. On the other hand, in the case that the liquid 24 is a hydrophobic liquid such as a hydrophobic solution, the surfaces of the magnetic particles 21 are preferably treated so as to be hydrophilic. Examples of such treatment include a treatment with a hydrophilic polymer and an amino treatment.

A timing of the introduction of the magnetic particles 21 into the fluid passage 39, 40, or 41 can be before or after the introduction of the liquid 24. Specifically, the magnetic particles 21 can be filled into the chamber 35, 36 or 37 in advance when fabricating the chip 34, or can be introduced from the above-mentioned opening after the liquid 24 has been introduced. Compared with the magnetic fluid, the magnetic particles 21, which are particulate, can be introduced into the fluid passage without giving any particular consideration to viscosity. Further, compared with the magnetic fluid, the magnetic particles 21 have few restrictions with regard to a liquid used for introduction.

The liquid 24 may be a sample to be analyzed by the fluid chip, a reaction liquid containing a component to be reacted with the sample, a buffer solution for holding constant the pH or the like of the sample or the reaction liquid, or the like. Further, examples of the liquid 24 include a reaction solution containing a component for causing a specified reaction such as an antigen or antibody component for causing specific immunological binding, an oligonucleotide component for causing a specific binding reaction with a nucleic acid, a component for causing a nucleic acid amplification reaction, an enzyme component for causing an enzyme reaction, or a mixture of the above. The reaction solution may be either hydrophobic or hydrophilic depending on a component to be analyzed.

Figure 4A:
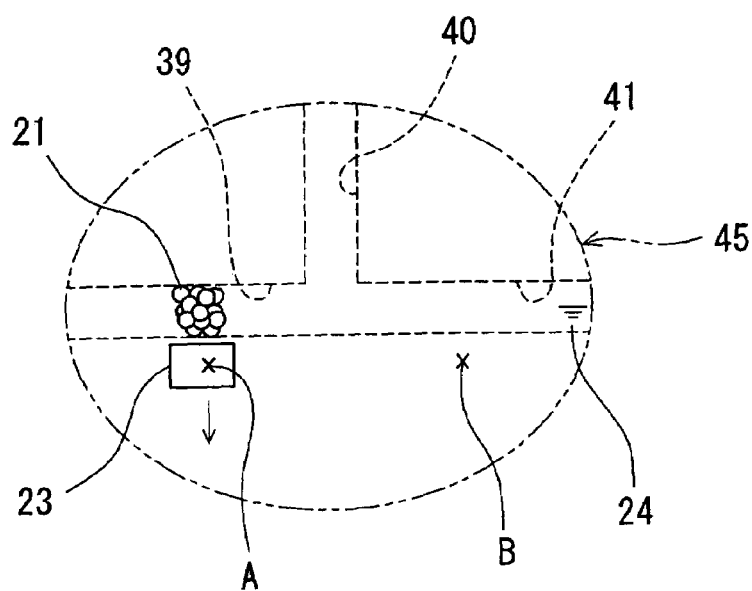
FIG. 4A is an enlarged view of a portion 45 of FIG. 3 (in which the magnetic particles are in an aggregated state)
Figure 4B:
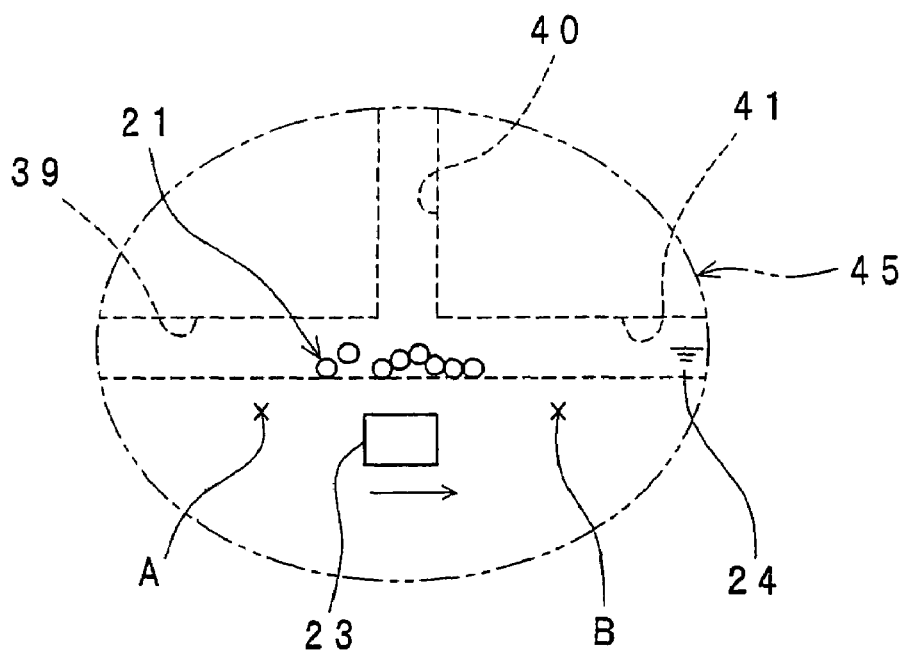
FIG. 4B is an enlarged view of the portion 45 of FIG. 3 (in which the magnetic particles are being moved)
Figure 4C:
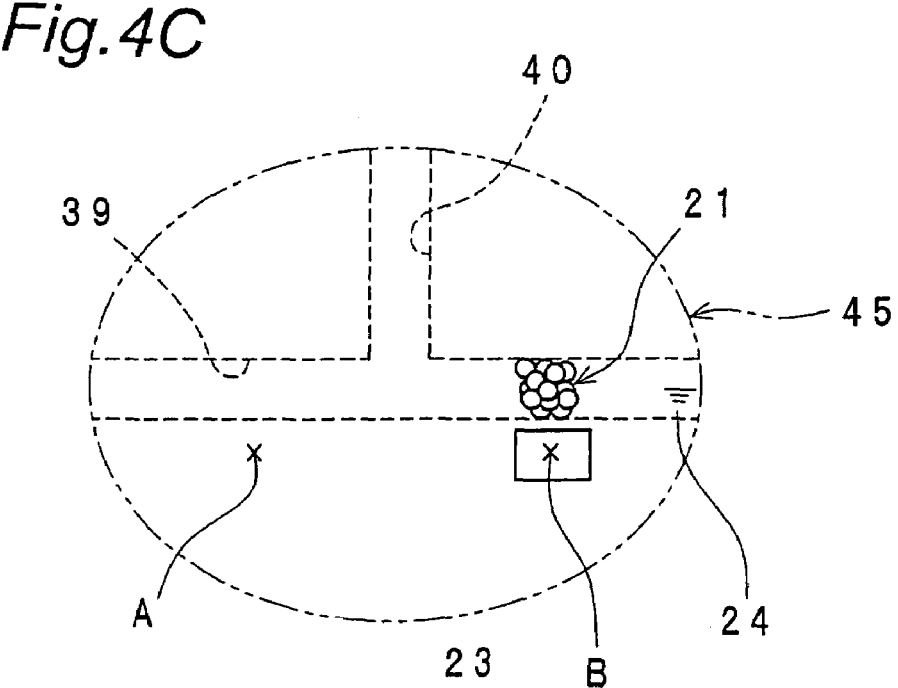
FIG. 4C is an enlarged view of the portion 45 of FIG. 3 (in which the magnetic particles are in an aggregated state)

By moving the magnetic particles 21, a valve can be formed in an arbitrary position. Following is a description of the method of doing this with reference to FIGS. 4A to 4C which are enlarged views of a portion 45 of FIG. 3. First, as shown in FIG. 4A, the permanent magnet 23 is disposed in a position A on the chip 34, so as to aggregate the magnetic particles 21 close to the permanent magnet 23 and thus produce a valve closed state (first magnetic force). Then, the permanent magnet 23 is moved on the chip 34 away from the fluid passage 39. As a result, the magnetic particles 21 are dispersed along a part of the wall of the fluid passage 39, so as to produce a valve open state (second magnetic force). As shown in FIG. 4B, with maintaining the valve open state, i.e. with the magnetic particles 21 maintained in the dispersed state, the permanent magnet 23 is moved toward a desired position B. As shown in FIG. 4C, upon the permanent magnet 23 being disposed at the position B adjacent to the fluid passage 41, the magnetic particles 21 are aggregated near the permanent magnet 23, so that a valve of the valve closed state is formed. In this way, the magnetic particles 21 can be moved to arbitrary positions so as to form the valve without affecting the liquid 24. Further, there are no particular limitations on the position in which a valve is formed in the fluid passages 39 to 41 and the chambers 35 to 37. Because the position of the valve by the magnetic particles 21 can be moved through the fluid passages 39 to 41 and the chambers 35 to 37 without affecting the liquid 24 in this way, switching among a plurality of fluid passages can be achieved by the valve by itself. Furthermore, various modifications can be easily carried out after fabrication of the fluid chip has been completed, resulting in high degree of freedom of fluid passage layout.

In FIG. 3, the magnetic particles 21 are disposed close to a position where the first fluid passage 39 is connected to the first chamber 35. Upon the permanent magnet 23 being brought close to the position where the magnetic particles 21 have been disposed in the fluid passage 39, the magnetic particles 21 aggregate so as to block the fluid passage 39. In this valve closed state, a flow of the liquid 24 through the first fluid passage 39 from the first chamber 35 toward the position of branching of the three fluid passages 39 to 41 are blocked, as well as a flow of the liquid 24 from this branching position toward the first chamber 35. In this state, the fluid passage 39 and the chamber 35 are cut off from the other fluid passages and chambers. This enables a chemical reaction only in the fluid passage 39 or the chamber 35.

Moreover, in the above valve closed state, because the flow of the liquid 24 from the position of branching of the fluid passages 39 to 41 toward the first chamber 35 is cut off, the liquid 24 can be fed into only the third chamber 37 from the second chamber 36 via the second and third fluid passages 40 and 41. In this way, by introducing a liquid into one of the fluid passages (micro channels) 39 to 41 or one of the chambers 35 to 37 connected thereto and then aggregating the magnetic particles 21 by an external magnetic force so as to form a plug at a desired site, the liquid 24 can be branched off and thus fed into unplugged targeted one(s) of the fluid passages 39 to 41 and chambers 35 to 37.

When the magnetic particles 21 have been disposed at the position shown in FIG. 3 and have been aggregated so as to block the fluid passage 39, if the permanent magnet 23 is moved toward the position of branching of the fluid passages 39 to 41 while being kept adjacent to the fluid passage 39, then the magnetic particles 21 move through the first fluid passage 39 toward the branching position while maintaining the state of being aggregated so as to block the fluid passage 39. As a result, the magnetic particles 21 plugging the fluid passage 39 act as a piston, and hence the liquid 24 on the branching position side with respect to the magnetic particles 21 in the first fluid passage 39 flows toward the branching position.

Figure 5A:
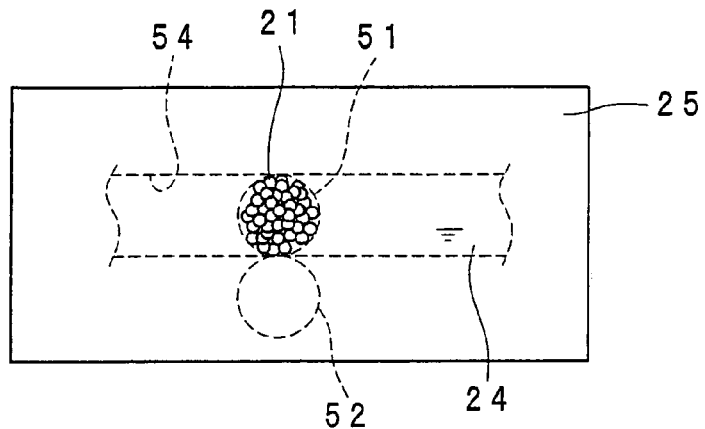
FIG. 5A is a schematic partial plan view showing an alternative of a magnetic field generator using electromagnets (valve closed state)
Figure 5B:
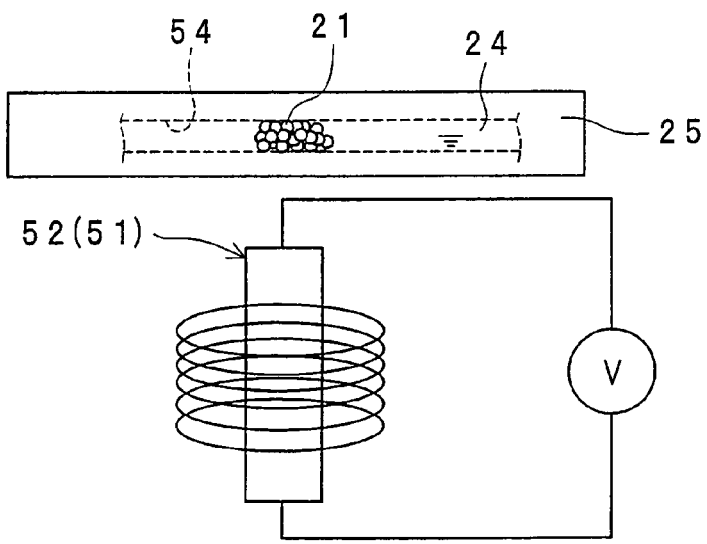
FIG. 5B is a side view of FIG. 5A.
Figure 5C:
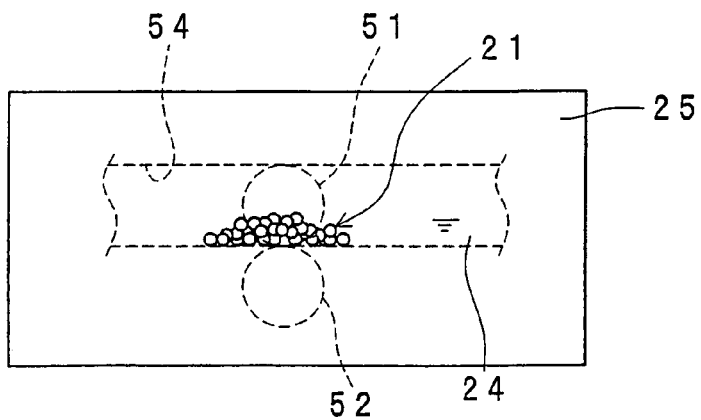
FIG. 5C is a schematic partial plan view showing the alternative of the magnetic field generator using electromagnets (valve open state)

There are no particular limitations on the method of applying the magnetic field to the magnetic particles. For example, electromagnets can be used instead of the permanent magnet. The electromagnets are especially preferable in term of that generation of the magnetic field in an arbitrary position and relative movement of the magnetic field can be achieved by electrical controls of the electromagnets. FIGS. 5A to 5C show an example in which electromagnets are adopted as the magnetic field generator. As shown in FIGS. 5A and 5B, first and second electromagnets 51 and 52 are arranged in advance at a position where a fluid passage 54 is to be opened and closed. The first electromagnet 51 is disposed right below the fluid passage 54 on an underside of a liquid support 25. The second electromagnet 52 is disposed in a position on the underside of the liquid support 25 but displaced from the fluid passage 54 when viewed from above. When the valve is closed, a current is passed through the first electromagnet 51 right below the fluid passage 54 so as to aggregate the magnetic particles 21. In this vale closed state, the current is not passed through the second electromagnet 52. When the valve is opened, the supply of the current to the first electromagnet 51 right below the fluid passage 54 is stopped, whereas the current is passed through the second electromagnet 52. This disperses the magnetic particles 21 in a state closely attached to a part of a wall of the fluid passage 54 so as to open the fluid passage 54. Use of electromagnets is preferable in that opening and closing of the valve can be carried out by controlling the current as described. Further, for adjusting the direction and strength of the magnetic field, a plurality of magnets can be used.

Following is a description of examples of the present invention with reference to the drawings.

EXAMPLE 1

A fluid chip having magnetic particles, fluid passages, and chambers therein was fabricated, and an effect of a valve of the magnetic particles was evaluated using a magnet.

First, the above-mentioned fluid chip shown in FIG. 2 was fabricated. The fabricated fluid chip is shown in FIG. 6. FIGS. 7A to 7D are photographs of the fabricated fluid chip, and FIGS. 8A to 8D are enlarged photographs of parts of FIGS. 7A to 7D respectively. The fluid chip was fabricated by following procedure. Using SILPOT® from Dow Corning Asia Co., Ltd, which is an example of PDMS (polydimethylsiloxane), the main solution and the polymerizing liquid were mixed together in a ratio of 9:1, and the mixture was poured into a mold having therein projections having shapes corresponding to fluid passages and chambers, and cured by being left at rest at room temperature for twenty four hours. Thereby, a chip was formed having therein recessed portions of shapes of fluid passages 39 to 41 (length 16 or 25 mm, width 600 µm, depth 600 µm) and chambers 35 to 37 (diameter 1 cm, depth 1.5 mm, diameter of penetrating opening 1 mm). A polystyrene resin plate (thickness 1.5 mm) was bonded onto a bottom of the chip, thus producing a fluid chip (overall diameter 4 cm, overall thickness 6 mm) opening out at the top only at openings 35a to 37a respectively formed for the chambers 35 to 37.

Figure 7A:
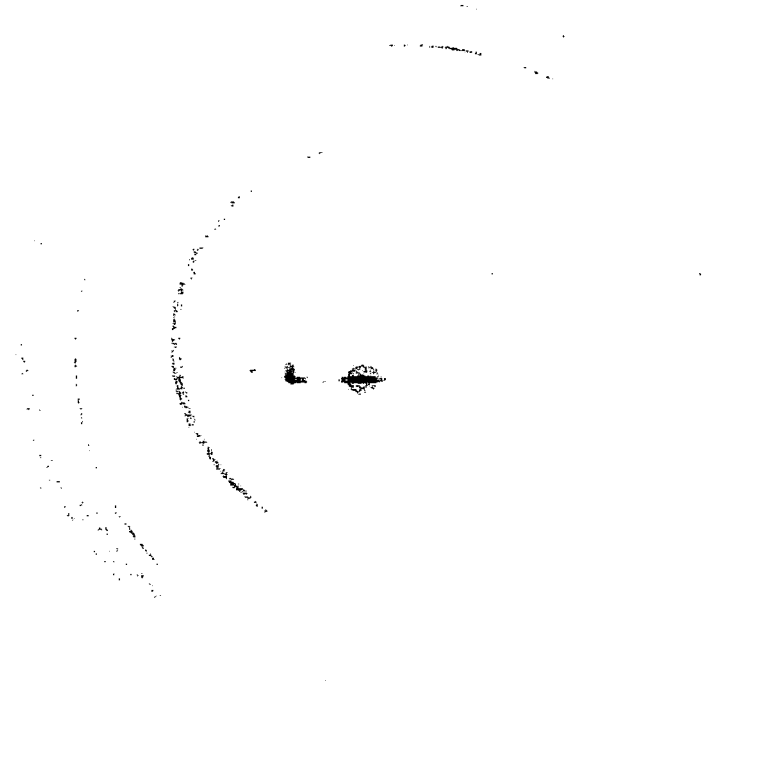
FIG. 7A is a photograph showing the chemical reaction apparatus of Example 1 (valve closed state)
Figure 7B:
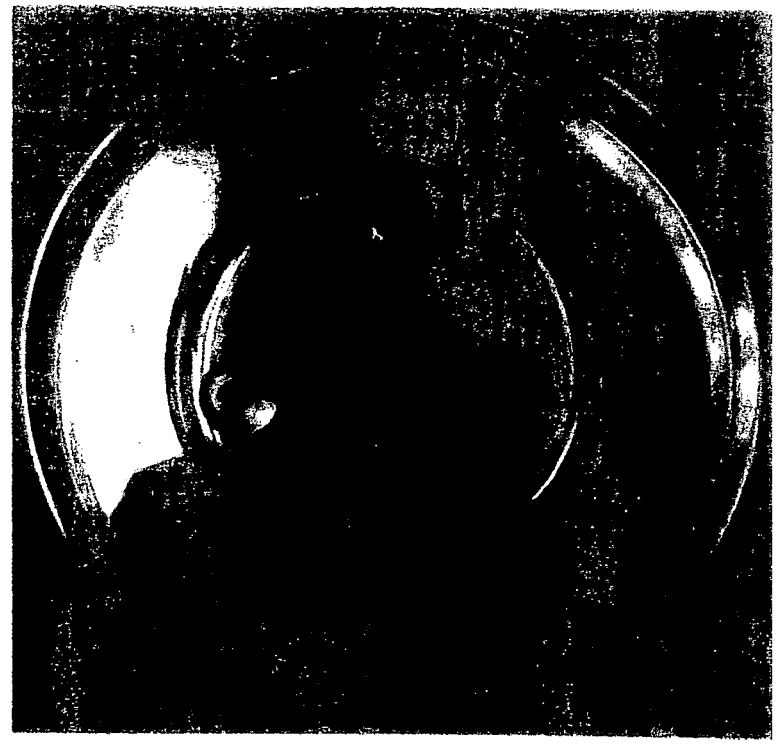
FIG. 7B is a photograph showing the chemical reaction apparatus of Example 1 (valve closed state with a dye solution introduced and a pressure applied to a liquid)
Figure 7C:
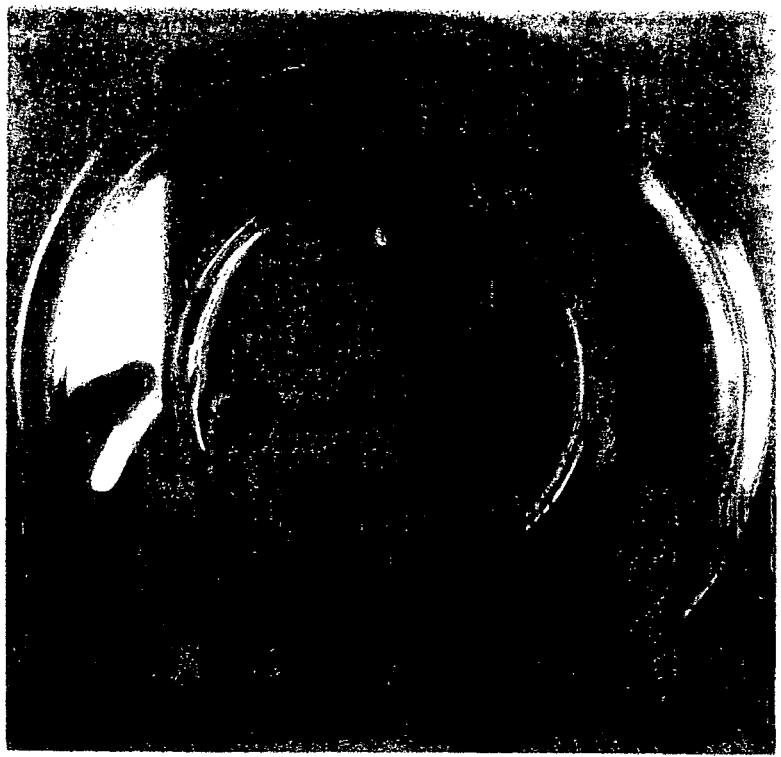
FIG. 7C is a photograph showing the chemical reaction apparatus of Example 1 (valve open state with the pressure applied to the liquid)
Figure 8A:
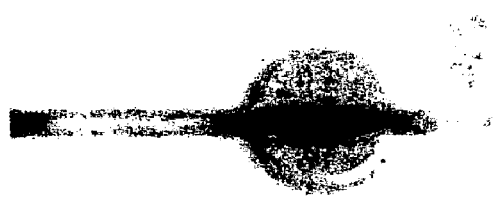
FIG. 8A is an enlarged photograph of part of FIG. 7A.
Figure 8B:
FIG. 8B is an enlarged photograph of part of FIG. 7B.
Figure 8C:
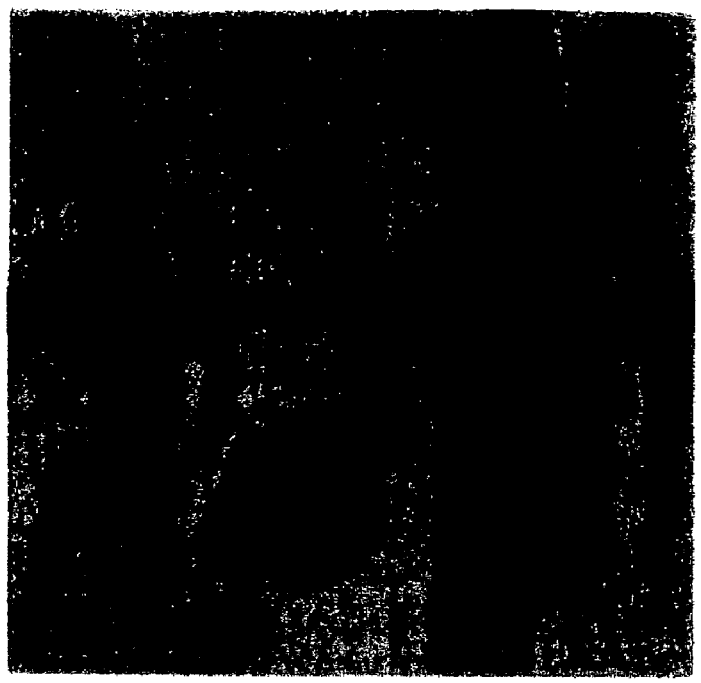
FIG. 8C is an enlarged photograph of part of FIG. 7C.

Next, a liquid 24 was filled into the chambers 35 to 37 and the fluid passages 39 to 41 formed in the chip 34, and then magnetic particles 21 (PLA-Particles-M, product number 12-02-105, particle diameter 100 μm from Micromod Patikeltechnologie GmbH,) were introduced from the opening 35a into the chamber 35. Further, a neodymium magnet (cylindrical with a diameter of 4 mm×5 mm, surface magnetic flux density 105 mT) 23 was disposed on an underside of the resin plate at a portion constituting a bottom wall of the fluid passages 39. The magnetic particles 21 were aggregated by the magnetic force from the neodymium magnet 23 acting via the resin plate so as to form a valve (valve closed state) in the fluid passage 39 (FIGS. 7A and 8A). Then, a dye solution 124 (food red aqueous solution) were added from the opening 36a of the chamber 36 and subjected to an application of pressure using a syringe. This resulted in that the dye solution 124 passed through the second fluid passage 40, and then did not pass through the first fluid passage 39 blocked by the valve formed therein in the closed state, but flowed into only the third fluid passage 41 (FIGS. 7B and 8B). Further, upon moving the neodymium magnet 23 approximately 5 mm away from right below the first fluid passage 39, the magnetic particles 21 were dispersed along the wall of the first fluid passage 39, resulting in that the valve becomes an open state. It was observed that upon applying pressure into the chamber 36 in this state, the dye solution 124 passed through the valve in the open state, and thus also flowed into the first fluid passage 39 and the first chamber 35 (FIGS. 7C and 8C). As a result of the above, it was demonstrated that in the state where the magnetic particles are blocking a fluid passage (the vale closed state), the flow of the liquid is cut off, whereas in the state where the magnetic particles are dispersed along the wall of the fluid passage (the valve open state), the liquid is allowed to pass through the valve with the magnetic particles not being swept along by the liquid but rather being maintained in their position.

Figure 7D:
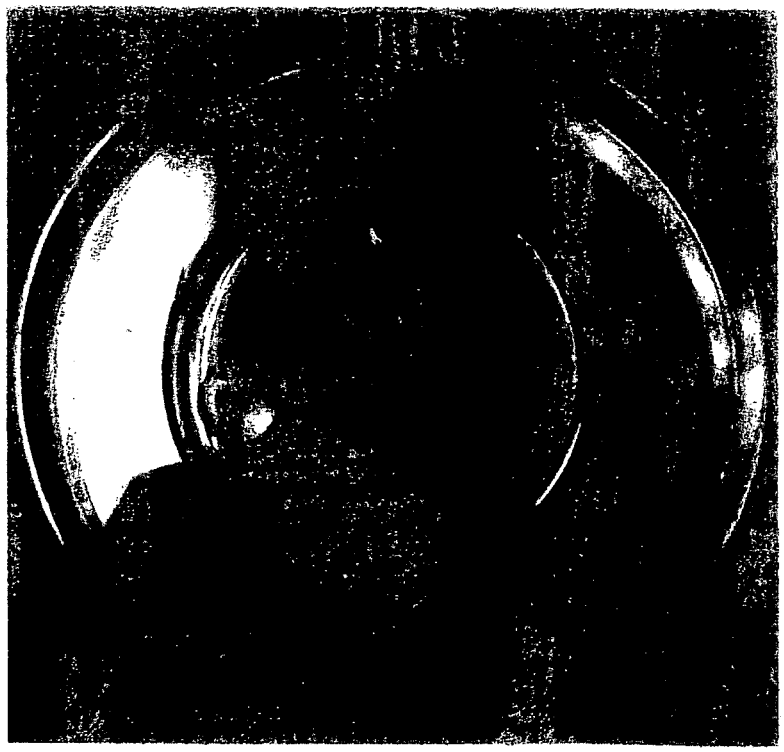
FIG. 7D is a photograph showing the chemical reaction apparatus of Example 1 (magnetic particles moved)
Figure 8D:
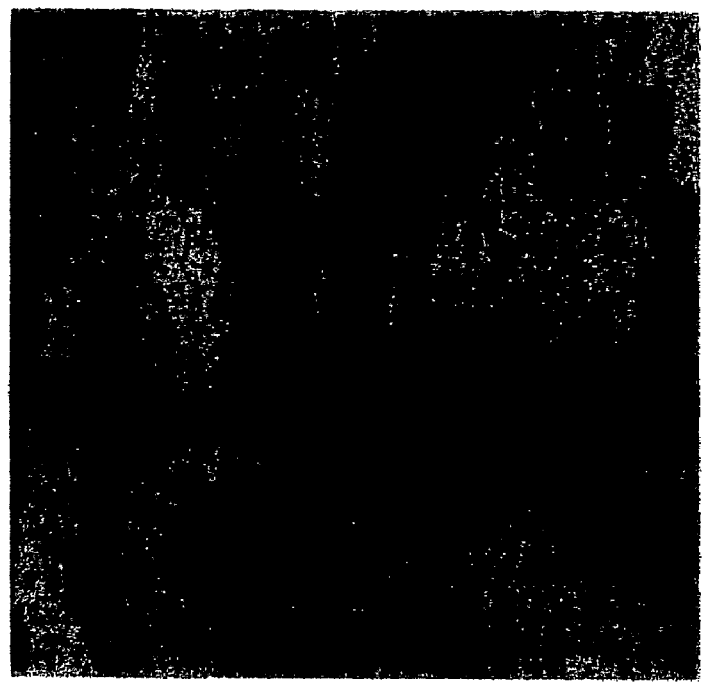
FIG. 8D is an enlarged photograph of part of FIG. 7D.

In addition, by moving the neodymium magnet 23 from right below the first fluid passage 39 to right below the third fluid passage 41 in the state where the dye solution 124 had been filled with the chambers 35 to 37 and the fluid passages 39 to 41, it was possible to move the magnetic particles 21 into the third fluid passage 41 and form the valve in the fluid passage 41. Thus, it was demonstrated that the valve can be formed at the position where the magnetic particles 21 were not originally arranged. Next, in the state in which the valve in the closed state was present in the third fluid passage 41, the liquid 24 was again supplied from the opening 36a of the second chamber 36 and subjected to an application of the pressure using a syringe. This resulted in that the liquid 24 passed through the second fluid passage 40 while pushing along the dye solution 124, and then did not pass through the fluid passage 41 having the closed valve therein, but rather flowed into only the first fluid passage 39 (FIGS. 7D and 8D). As a result, it was demonstrated that the formation of a valve using the magnetic particles 21 is possible at any chosen position in the second fluid passage 40 or the third fluid passage 41, there being no particular limitations on the position in the fluid passages at which the valve is formed.

As discussed above, according to the arrangement of the present invention, even though a valve is not installed in the fluid chip in advance, a liquid can be made to flow into a targeted fluid passage by controlling an external magnetic field on magnetic particles installed in a fluid passage

EXAMPLE 2

Figure 9:
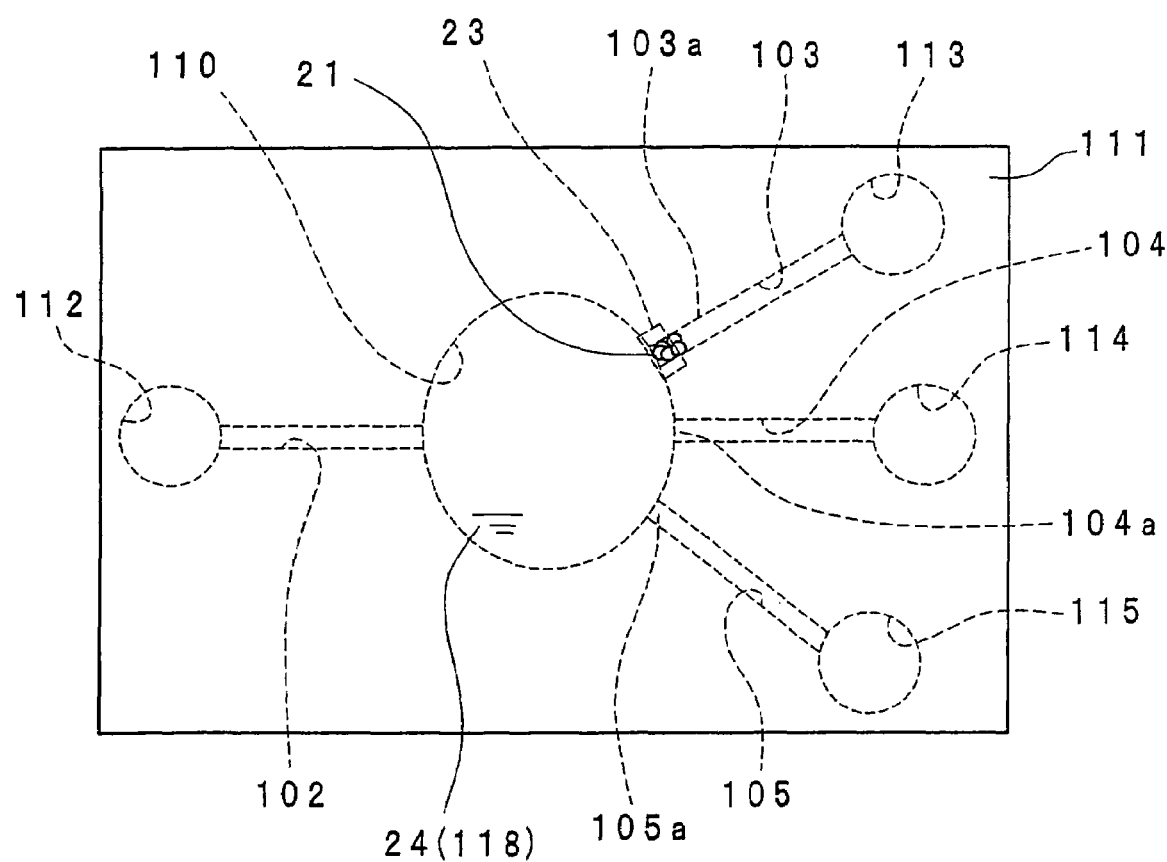
FIG. 9 is a schematic plan view showing a chemical reaction apparatus of Example 2.
Figure 10:
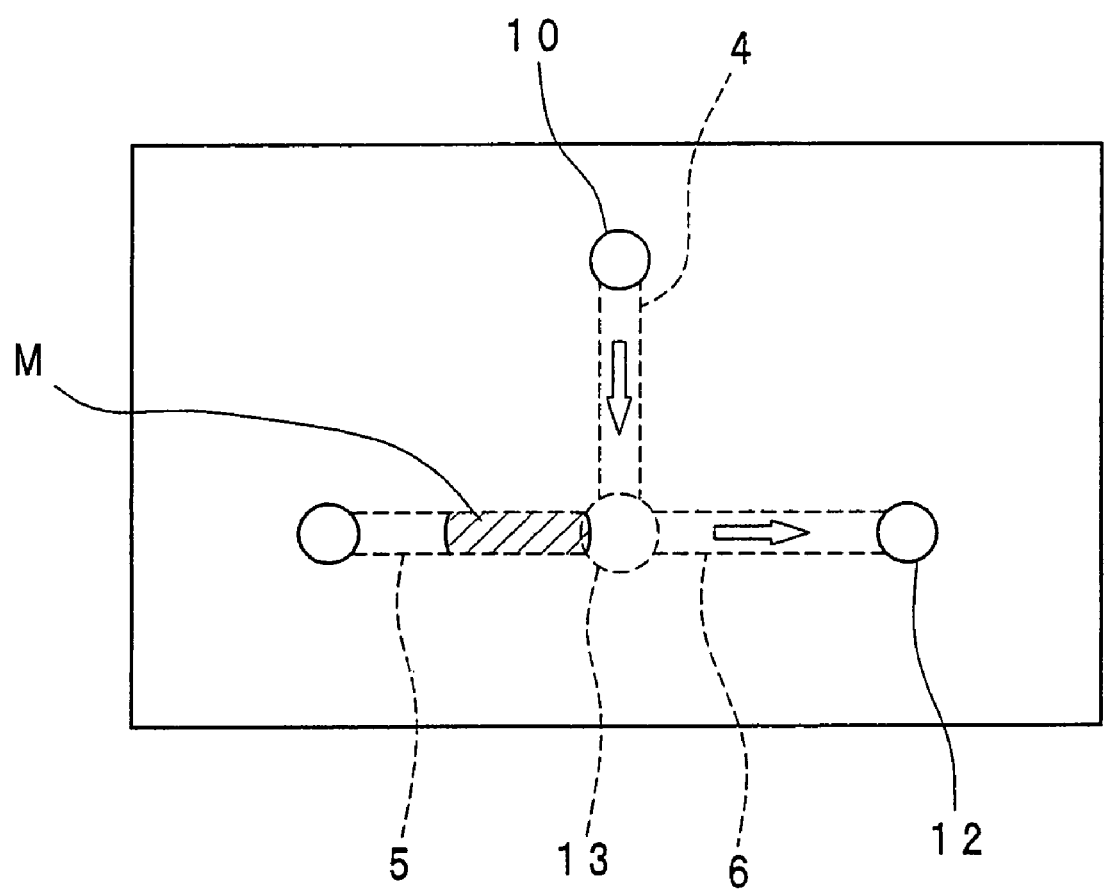
FIG. 10 is a schematic view showing a conventional fluid passage switching using a magnetic fluid.

A fluid chip as shown in FIG. 9 was fabricated using a similar procedure as in Example 1. Specifically, formed in a liquid support 111 as a fluid chip is a central chamber 110, and first, second, third, and fourth chambers 112, 113, 114, and 115 each smaller than the central chamber 110. Further, first, second, third, and fourth fluid passages 102, 103, 104, and 105 respectively connecting the central chamber 110 to the first to fourth chambers 112 to 115 were formed. Furthermore, an opening (not shown) for introducing liquid and magnetic particles 21 was formed in each of the first to fourth chambers 112 to 115.

A buffer solution 118 was introduced, and then the magnetic particles 21 were introduced, and the magnetic particles 21 were aggregated using a permanent magnet 23 so as to form a valve (valve closed state) at a branch point 103a of the second fluid passage 103 from the central chamber 110.

Next, a liquid 24 was passed from the first chamber 112 through the first fluid passage 102 so as to be filled into the central chamber 110, and subjected to an application of pressure using a syringe. As a result, because the magnetic particles 21 were aggregated at the branch point 103a to form the valve in the closed state, the liquid 24 did not flow into the second fluid passage 103, but rather passed through branch points 104a and 105a and flowed into the third and fourth fluid passages 104 and 105.

Further, the magnetic particles 21 forming the valve were moved to the branch point 104a of the third fluid passage 104 using the permanent magnet 23 so as to newly form the valve at this position. After that, pressure was again applied using a syringe from the first chamber 112. As a result, the liquid 24 was flowed into the second and fourth fluid passages 103 and 105 without flowing into the third fluid passage 104. Furthermore, by moving the magnetic particles 21 into the central chamber 110 using the permanent magnet 23 while maintaining the open valve state, it was possible to remove the magnetic particles 21 from a branch point when the magnetic particles 21 were not being used as the valve.

According to the fluid chip of the present invention, the fluid movement control method, and the chemical reaction apparatus using the fluid chip, magnetic particles can be aggregated or dispersed reversibly so as to function as a valve or a piston for plugging or moving a liquid by controlling an external magnetic field. The apparatus and method according to the present invention are thus useful in micro fluid control, and can be used in various applications such as health diagnosis chips.

Although the present invention has been fully described in conjunction with preferred embodiments thereof with reference to the accompanying drawings, various changes and modifications are possible for those skilled in the art. Therefore, such changes and modifications should be construed as included in the present invention unless they depart from the intention and scope of the invention as defined by the appended claims.

What is claimed is:
1. A fluid chip, comprising:
a liquid support for supporting a liquid;
a fluid passage defined by being surrounded by the liquid support and through which the liquid moves; and
a plurality of magnetic particles disposed in the fluid passage, wherein reversible switching is possible between a closed state in which a first magnetic force acts on the magnetic particles so as to aggregate the magnetic particles, thereby blocking the fluid passage and cutting off a flow of the liquid, and an open state in which a second magnetic force weaker than the first magnetic force acts on the magnetic particles so as to disperse the magnetic particles along a part of a wall of the fluid passage, thereby opening the fluid passage and allowing the liquid to flow, and wherein at the closed state at least some of the plurality of magnetic particles contact with both of the liquid support and the liquid.

2. The fluid chip according to claim 1, wherein a diameter of each of the magnetic particles is not less than 1 μm and not more than 100 μm.

3. The fluid chip according to claim 1, wherein the liquid is a hydrophilic liquid, and wherein each of the magnetic particles has a water-repellent surface.

4. The fluid chip according to claim 3, wherein the water-repellency of the surface of the magnetic particle is achieved by treating with a water-repellent polymer.

5. The fluid chip according to claim 4, wherein the water-repellency of the surface of the magnetic particles is achieved by a treatment of modifying the surface with hydrophobic functional groups.

6. The fluid chip according to claim 1, wherein the liquid is a hydrophobic liquid, and wherein each of the magnetic particles has a hydrophilic surface.

7. The fluid chip according to claim 6, wherein the hydrophilicity of the surface of the magnetic particle is achieved by treating with a hydrophilic polymer.

8. The fluid chip according to claim 1, wherein a cross sectional area of the fluid passage is not less than 1 μm$^2$ and not more than 1×10$^6$ μm$^2$.

9. A method of controlling movement of liquid in a fluid chip, wherein the fluid chip comprises a liquid support for supporting a liquid, a fluid passage defined by being surrounded by the liquid support and through which the liquid moves, and a plurality of magnetic particles disposed in the fluid passage, wherein the method comprises:

making a first magnetic force act from a magnet on the magnetic particles so as to aggregate the magnetic particles, thereby blocking the fluid passage and cutting off a flow of the liquid; and making a second magnetic force weaker than the first magnetic force act from the magnet on the magnetic particles so as to disperse the magnetic particles along a part of a wall of the fluid passage, thereby opening the fluid passage and allowing the liquid to blow, wherein reversible switching is possible between the aggregation of the magnetic particles by making the first magnetic force act thereon, and the dispersion of the magnetic particles by making the second magnetic force act thereon, and wherein when the liquid is allowed to flow at least some of the plurality of dispersed magnetic particles contact with both of the liquid support and the liquid.

10. The method according to claim 9 further comprising, moving the magnet while maintaining a state of the first magnetic force acting on the magnetic particles, so as to move the magnetic particles from one position to other position in the fluid passage while maintaining the aggregated state, thereby the liquid is moved through the fluid passage.

11. The method according to claim 9 further comprising, moving the magnet while maintaining a state of the second magnetic force acting on the magnetic particles, so as to move the magnetic particles from one position to other position in the fluid passage while maintaining the dispersed state along the wall of the fluid passage.

12. The method according to claim 9, wherein a diameter of each of the magnetic particle is not less than 1 μm and not more than 100 μm.

13. The method according to claim 9, wherein the magnet is a permanent magnet.

14. The method according to claim 9, wherein the magnet is an electromagnet.

15. The method according to claim 9, wherein a hydrophilic liquid is employed as the liquid, and wherein each of the magnetic particles have a water-repellent surface.

16. The method according to claim 15, wherein the water-repellency of the surface of the magnetic particle is achieved by treating with a water-repellent polymer.

17. The method according to claim 15, wherein the water-repellency of the surface of the magnetic particle is achieved by treatment of modifying the surface with hydrophobic functional groups.

18. The method according to claim 9, wherein a hydrophobic liquid is employed as the liquid, and wherein the each of the magnetic particles has a hydrophilic surface.

19. The method according to claim 18, wherein the hydrophilicity of the surface of the magnetic particle is achieved by treating with a hydrophilic polymer.

20. The method according to claim 9, wherein the fluid passage of the fluid passage is not less than 1 μm$^2$ and not more than 1×10$^6$ μm$^2$.

21. A chemical reaction apparatus comprising:

a fluid chip having at least one fluid passage, at least one chamber, and a plurality of magnetic particles disposed in the fluid passage, a liquid being introduced from outside into the fluid passage and the chamber followed by a chemical reaction in the chamber or the fluid passage; and a magnetic field generator capable of controlling a magnetic field generated in the fluid chip such as to reversibly switch between a closed state in which a first magnetic force acts on the magnetic particles so as to aggregate the magnetic particles, thereby blocking the fluid passage and cutting off a flow of the liquid, and an open state in which a second magnetic force weaker than the first magnetic force acts on the magnetic particles so as to disperse the magnetic particles along a part of a wall of the fluid passage, thereby opening the fluid passage and allowing the liquid to flow, wherein at the closed state at least some of the plurality of magnetic particles contact with both of the liquid support and the liquid.

22. The chemical reaction apparatus according to claim 21, wherein the magnetic particles are aggregated at a branch point of the fluid passages or in the fluid passage to produce the closed state by the control of the magnetic field by the magnetic field generator so as to switch the fluid passage, thereby moving the liquid into targeted one of the fluid passages and the chambers.

23. The chemical reaction apparatus according to claim 21, wherein the magnetic field generator is capable of controlling the magnetic field so that the magnetic particles move from one position to other position in the fluid passage while maintaining the aggregated state by the first magnetic force.

24. The chemical reaction apparatus according to claim 21, wherein the magnetic field generator is capable of controlling the magnetic field so that the magnetic particles move from one position to other position in the fluid passage while maintaining the dispersed state along the wall of the fluid passage by the second magnetic force.

25. The chemical reaction apparatus according to claim 21, wherein the magnetic field generator is provided with a permanent magnet.

26. The chemical reaction apparatus according to claim 21, wherein the magnetic field generator is provided with an electromagnet.

* * * * *

UNITED STATES PATENT AND TRADEMARK OFFICE
CERTIFICATE OF CORRECTION

| | |
|---|---|
| PATENT NO. | : 7,547,415 B2 |
| APPLICATION NO. | : 11/510726 |
| DATED | : June 16, 2009 |
| INVENTOR(S) | : Yukari Hataoka et al. |

It is certified that error appears in the above-identified patent and that said Letters Patent is hereby corrected as shown below:

ON THE TITLE PAGE:

Below section "(65) Prior Publication Data", and before Item "(30) Foreign Application Priority Data", insert the following:

--Related U.S. Application Data

(63) Continuation of application No. PCT/JP2006/301324, filed January 27, 2006.--

Signed and Sealed this

Twenty-ninth Day of September, 2009

David J. Kappos
*Director of the United States Patent and Trademark Office*